United States Patent [19]
Jackson, Jr.

[11] Patent Number: 5,445,510
[45] Date of Patent: Aug. 29, 1995

[54] MOLD HEATING APPARATUS

[75] Inventor: Kenneth L. Jackson, Jr., Farmington, N.H.

[73] Assignee: Davidson Textron Inc., Dover, N.H.

[21] Appl. No.: 144,694

[22] Filed: Oct. 28, 1993

[51] Int. Cl.⁶ .................. B29C 41/18; B29C 41/46
[52] U.S. Cl. .................... 425/182; 249/79; 249/102; 264/302; 264/DIG. 60; 425/435
[58] Field of Search .............. 249/79, 141, 155, 102; 425/405.1, 182, 183, 186, 435; 264/302, 327, DIG. 60

[56] References Cited

U.S. PATENT DOCUMENTS

| | | | |
|---|---|---|---|
| 4,179,093 | 12/1979 | Western | 425/405.1 |
| 4,621,995 | 11/1986 | Wersosky | 425/144 |
| 4,623,503 | 11/1986 | Anestis et al. | 264/302 |
| 5,106,285 | 4/1992 | Preston | 425/144 |

FOREIGN PATENT DOCUMENTS 59-2807  1/1984  Japan .................. 249/79

*Primary Examiner*—James P. Mackey
*Attorney, Agent, or Firm*—Reising, Ethington, Barnard & Perry

[57] ABSTRACT

Apparatus for heating and cooling a mold onto which thermoplastic material is cast and fused to form a finished article includes a plenum having an inlet and an outlet for connection to a fluid heating and cooling system and a mold box having a plurality of cavities for selectively receiving interchangeable tube bundles that are selectively positioned in a movably sealed relationship within the mold box and wherein each tube bundle has a mold and a tube array that are maintained in a fixed relationship during interchange thereof into and out of said mold box so as to maintain individually heat balanced molds.

4 Claims, 2 Drawing Sheets

5,445,510

MOLD HEATING APPARATUS

TECHNICAL FIELD

This invention relates to mold heating and/or cooling apparatus and more particularly to such apparatus that includes a tube bundle for directing a jet stream of fluid against the mold for treating a thermoplastic material within the mold.

BACKGROUND OF THE INVENTION

In the past apparatus for heating and/or cooling molds onto which thermoplastic material is deposited and fused to form a thin shell have utilized a tube bundle fixed between a plenum inlet and a plenum outlet so as to direct a jet stream of fluid against the mold for treating the thermoplastic material deposited therein. Such systems, while suitable for their intended purpose, were configured such that each time a different mold was placed on the apparatus, it was necessary to provide a different plenum arrangement that would both accommodate the different mold and support a different tube bundle configured to direct a different jet stream pattern against the mold for balancing the heat pattern across the mold for assuring that the mold part being produced would be evenly formed across the heated mold surface on which the thermoplastic material is deposited and fused to form a thin shell part on the mold. Examples of such prior art arrangements are shown in U.S. Pat. Nos. 4,621,995; 4,623,503; and 5,106,285.

Since the mold cavity positions are established by the fixed tubing on the mold box, molds with different shapes and dimensions cannot be substituted for a mold that conforms to the length and position of the tubes that comprise the tubing. As a consequence, the production flexibility of mold boxes with a fixed tube sheet are greatly limited, e.g., to the use of molds having a shape that conforms to the fixed tubing sheet in the mold box.

SUMMARY OF THE INVENTION

In accordance with one aspect of the present invention, the multiple mold box of the present invention is adapted to support one or more individual mold and tube bundles each of which are replaceable as a unit within the mold box while maintaining a fixed, heat balanced relationship between the mold and the tubes for flowing fluid against the mold for treating thermoplastic material deposited within the mold.

In another aspect of the present invention, the multiple mold box of the present invention includes one or more openings therein each adapted to receive a tube bundle having a first plate for supporting a mold and a second plate serving as a header for a plurality of tubes having outlets located to form a cavity with a shape closely conforming to the outer surface of the mold supported on the first plate and wherein the tube bundle is replaceable as a unit in the mold box to enable the mold box to be configured to a number of different mold shapes.

A feature of the present invention is to provide such a multiple mold box and replaceable tube bundles that are located in sealed relationship when the tube bundles are located within the multiple mold box for preventing fluid leakage from the mold box and for preventing fluid bypass between a plenum inlet and a plenum outlet for supplying conditioning fluid with respect to the mold supported within the tube bundle.

Still another feature of the present invention is to provide apparatus for heating and cooling a mold onto which thermoplastic material is cast and fused to form a finished article. The apparatus includes a plenum having an inlet and an outlet for connection to a fluid heating and cooling system and a mold box having a plurality of openings for selectively receiving interchangeable tube bundles that are selectively positioned in a movably sealed relationship within the mold box. Each tube bundle has a mold and a tube array that are maintained in a fixed relationship during interchange thereof into and out of said mold box so as to maintain individually heat balanced molds.

Yet another feature of the present invention is to provide an air distribution system for directing heating and cooling fluid to the underside of a mold having a heated surface thereon adapted to receive thermoplastic material and for sequentially fusing plastic materials together on the heated surface of the mold and for cooling the fused thermoplastic material to form a shell conforming to the shape of the heated surface of the mold. The air distribution system includes a mold box having one or more openings; a plenum having an inlet and an outlet; a tube bundle having a first plate portion and a second plate portion having an inner surface and an outer surface; a mold supported on the first plate portion, the mold having an inner surface and an outer surface; and a plurality of tubes connected to the second plate portion. Each of the tubes has an inlet at the outer surface of the second plate portion and an outlet located adjacent the outer surface of the mold. These tubes thus permit fluid to be directed from the plenum inlet and against the mold as a jet flow and for return flow of the jet flow through the mold box and out the plenum outlet. The tube bundle has a first seal portion engageable with the mold box for sealing against fluid leakage between the tube bundle and the mold box at the first plate. The tube bundle also has a second seal portion engageable with the mold box for sealing against fluid leakage between the tube bundle and the mold box at the second plate and for sealing the mold box cavity or cavities from the plenum inlet. Each of the tube bundles is removable from the mold box for permitting interchangeability of the tube bundles within the mold box without changing the heat balanced flow relationship between the mold and fluid flow through the tubes.

BRIEF DESCRIPTION OF THE DRAWINGS

Reference is now made to the accompanying drawings in which.

DETAILED DESCRIPTION OF THE PREFERRED EMBODIMENTS

Figure 1:
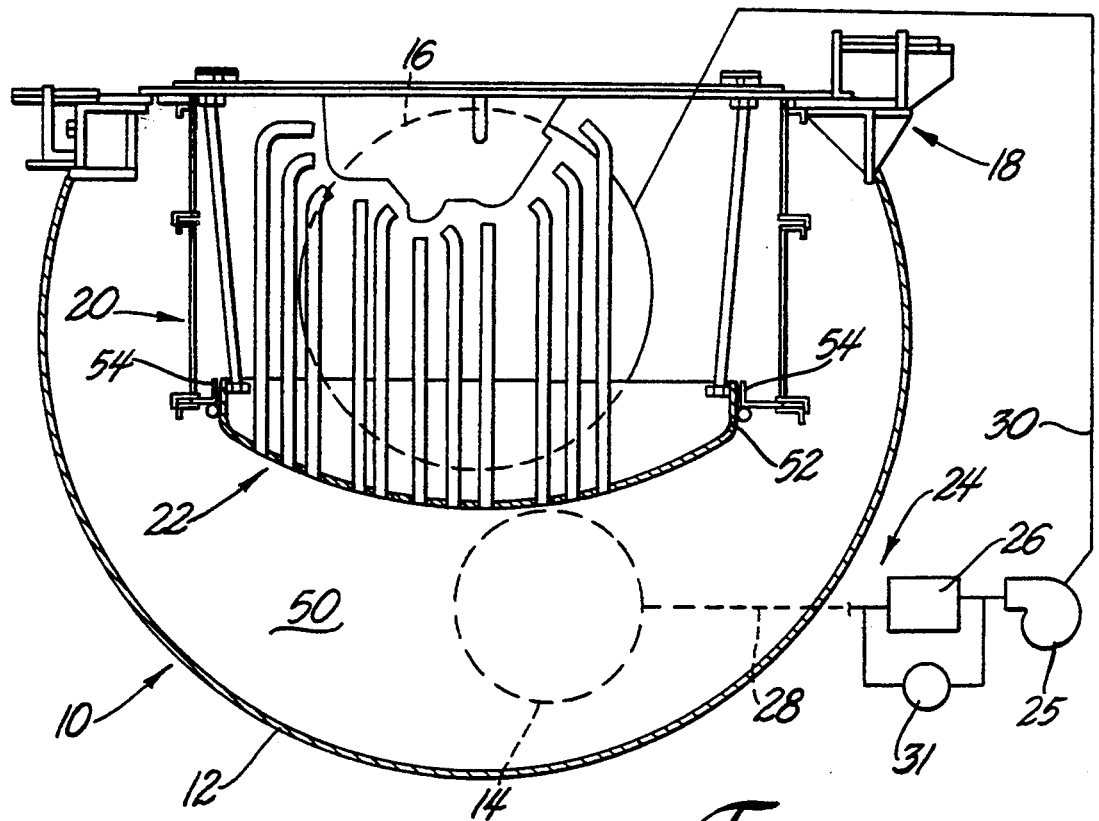
FIG. 1 is a sectional view of the mold box assembly of the present invention.

Referring now to FIG. 1, a mold box assembly 10 is illustrated that includes a plenum 12 having an inlet 14 and an outlet 16. The plenum 12 is associated with a framework 18 that supports a tube bundle or tube/mold module.

The holder 20 carries one or more replaceable tube bundles of tube/mold modules 22 each constructed in accordance with the present invention for improving the flexibility of manufacture of plastic shells wherein a thermoplastic material is processed within a mold by directing heating and cooling fluid from an air distribution system 24 against the underside of the mold during the processing sequence to be described.

The air distribution system 24 includes an air pump 25 that directs air through a heater 26 and a duct system 28 to the plenum inlet 14 thence into the tube bundles 22. Return air flow from the tube bundles 22 passes through the plenum outlet 16 and a duct system 30 either to be reheated by the heater 26 or discharged during atmosphere. During the cooling operation the air flow bypasses the heater 26 via a shunt 31 such that ambient air is directed through the tube bundles 22. A typical air pumping heating and cooling system for use in the air distribution system 10 of the present invention is set forth in U.S. Pat. No. 4,623,503, which is incorporated herein by reference.

In the past air tubes have been fixed to the mold box such that a jet flow pattern therefrom only matched a particular mold shape. In order to adapt mold boxes for a wider variety of mold types it was proposed to include a plurality of tubes on a rotatable support that would position a particular tube array with respect to a mold type to improve manufacturing flexibility. Such a system is shown in U.S. Pat. No. 4,890,995 assigned to the assignee of the present invention.

While providing greater flexibility than mold boxes with fixed tube patterns, such rotatable plural tube patterns did not enable a mold to be precisely positioned in a fixed relationship with an air tube pattern that would assure that the heat balance across the mold was optimized for a particular part. Furthermore, the rotatable mounting system for the plural air tube patterns add to the cost and complexity of the manufacturing apparatus by requiring expensive rotary seals to prevent air leakage from the mold box assembly.

According to the present invention, the module holder 20 is configured to support replaceable tube/mold modules 22 that are configured to assure such heat balance while enabling the mold box assembly 10 to be used as a flexible manufacturing apparatus.

Figure 3:
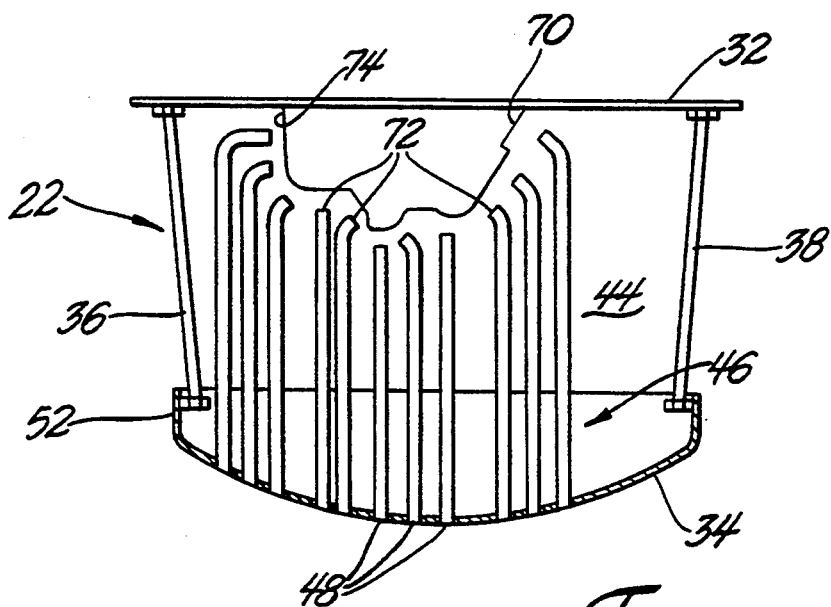
FIG. 3 is a view of a replaceable tube bundle of the present invention removed from the tube bundle holder.
Figure 2:
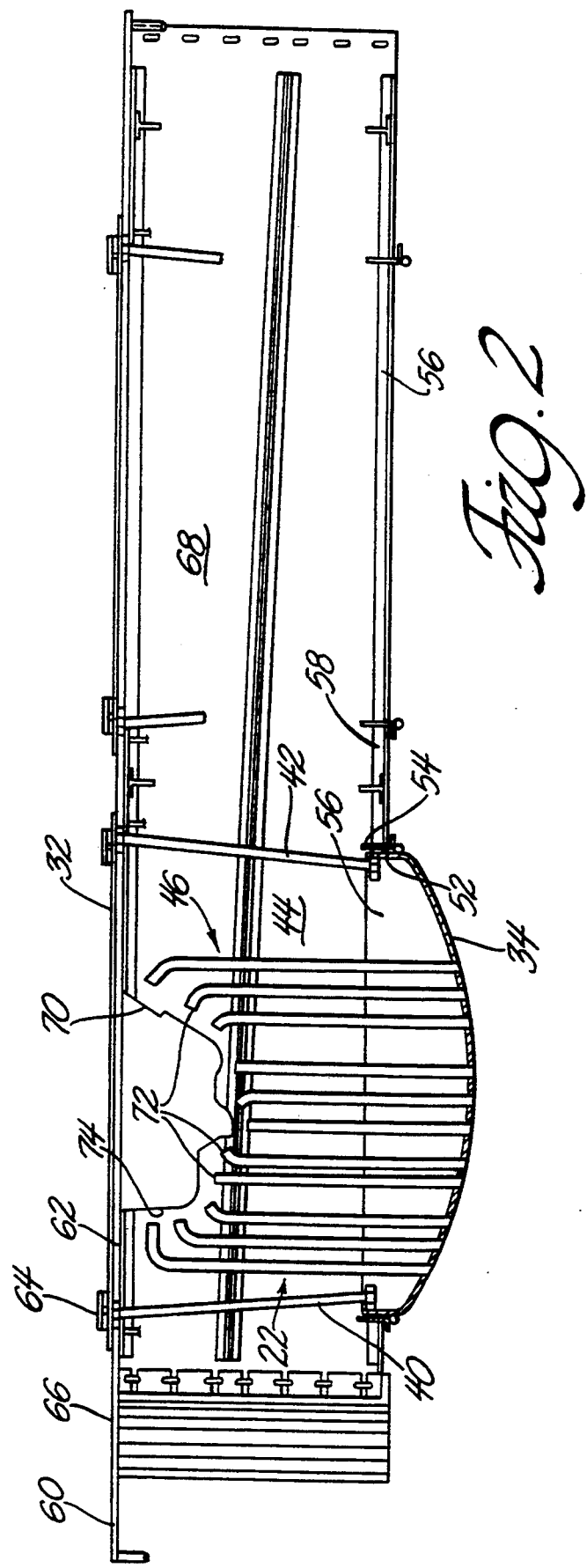
FIG. 2 is a longitudinal sectional view of a tube bundle holder in the mold box assembly of FIG. 1.

Thus, referring to FIG. 3, a replaceable tube/mold modules bundle 22 is illustrated removed from the mold box assembly 10. The module 22 includes an upper plate or first plate portion 32 and a lower plate or second plate portion 34. The first plate portion 32 is joined to the second plate portion 34 by side rods 36, 38 and fore and aft rods 40, 42 so as to form a mold cavity 44 therebetween. The second plate portion 34 forms a header for a plurality of tubes 46 each having an inlet end 48 connected through the second plate portion 34 to provide a fluid connection to a plenum space 50 that is in communication with the plenum inlet 14. The second plate portion 34 has a peripheral edge portion 52 that is located in sliding sealing relationship with a sealing flange 54 formed around an access opening 56 in the bottom wall 58 of the module holder 20. The upper plate 32 of the module 22 is supported on the top wall 60 of the module holder 20 at an access opening 62 therethrough that is dimensioned such that the replaceable module can be inserted into the module holder 20 or removed therefrom so that different mold shapes can be processed within the mold box assembly 10. The upper plate 32 is held by a clamp and face seal 64 against the outer surface 66 of the top wall 60 to seal around the periphery of the access opening 62 to prevent fluid leakage from a plenum space 68 that communicates with the mold cavities 44 and the plenum outlet 16.

In accordance with the invention each upper plate 32 of the module carries a mold 70 that is shaped to conform to the outlets 72 on the ends of the plurality of tubes 46 such that the outlets 72 are located adjacent the outer surface 74 of the mold 70 at selected points to provide a heat balance across the mold 70 best suited for processing the thermoplastic material type that is deposited within the mold 70 during formation of a part therein° The outlets 72 direct a jet flow of fluid against the mold that flows away from the outer surface 74 following impact thereagainst thence for return flow through the mold cavity 44 and plenum space 68 to the plenum outlet 16 for further processing within the air distribution system 24.

By virtue of the above-described apparatus, each of the modules 22 are removable from the mold box assembly for permitting interchangeability of tube bundles within the mold box assembly without changing the heat balanced flow relationship between the mold and fluid flow through said tubes.

The present invention is suitable for processing a wide range of thermoplastic materials including polyvinyl chloride, polyvinyl chloride foam material, polyurethane and polyurethane foam materials, TPO (thermoplastic olefins); copolyesters; ABS (acrylonitrile-butadiene-styrene); ASA (acrylonitrile-styreneacrylic rubber); or any alloys or blends of these materials. Typical processes that can be practiced on the apparatus of the present invention include those set forth in U.S. Pat. Nos. 4,610,620 and 4,623,503.

The use of individually replaceable modules where the mold remains fixed to the module assures individually heat balanced molds that can be run on the same mold box. Such apparatus allows any combination of color or styled parts to be processed in the same mold box. For example, instrument panel shells, air bag or secondary impact restraint system doors and glove box doors, or any other object can be made in the same mold box at the same time.

Other variations and modifications are possible without departing from the scope and spirit of the invention as defined in the appended claims.

What is claimed is:

1. An air distribution system for directing heating and cooling fluid to the underside of a mold having a heated surface thereon adapted to receive thermoplastic material and for sequentially fusing plastic materials together on the heated surface of the mold and for cooling the fused thermoplastic material to form a shell conforming to the shape of the heated surface of the mold comprising:

a mold box having at least one cavity; a plenum having an inlet and an outlet; a module holder adapted to hold a tube/mold module in a readily removable manner in said cavity;

a plurality of interchangeable tube/mold modules adapted to be held by said module holder in said cavity;

each said tube/mold module having a first plate portion and a second plate portion, said second plate portion having an inner surface and an outer surface; said first plate portion adapted to be supported by said module holder to thereby support said module in said cavity; a mold fixed to said first plate portion; said mold having an inner surface and an outer surface; a plurality of tubes fixed to said second plate portion; each of said tubes having an inlet at said outer surface of said second plate portion; each of said tubes having an outlet located adjacent said outer surface of said mold for directing fluid from said plenum inlet for jet flow against said mold and for return flow of said jet flow through said mold box and out said plenum outlet; rigid support structure separate and distinct from said mold box interconnecting said first and second plate portions and supporting said tubes in fixed relation with respect to said mold independently of said mold box; a first seal portion engageable with said mold box for sealing against fluid leakage between said module and said mold box at said first plate portion; a second seal portion engageable with said mold box for sealing against fluid leakage between said module and said mold box at said second plate portion and for sealing said mold box cavity from said plenum inlet;

said mold and fluid flow through said tubes in each said module having a heat balanced flow relationship that is different from that in the other of said modules; and each of said modules being insertable in and removable from said cavity in said mold box for permitting interchangeability of said modules within said mold box without changing the heat balanced flow relationship between said molds and fluid flow through the tubes associated with said molds.

2. An air distribution system for directing heating and cooling fluid to the underside of a mold having a heated surface thereon adapted to receive thermoplastic material and for sequentially fusing plastic materials together on the heated surface of the mold and for cooling the fused thermoplastic material to form a shell conforming to the shape of the heated surface of the mold comprising:

a mold box having at least one cavity; a plenum having an inlet and an outlet; a module holder adapted to hold a tube/mold module in a readily removable manner in said cavity;

a plurality of interchangeable tube/mold modules adapted to be held by said module holder in said cavity;

each said module having a first plate portion and a second plate portion having an inner surface and an outer surface; said first plate portion adapted to be supported by said module holder to thereby support said module in said cavity; a mold fixed to said first plate portion; said mold having an inner surface and an outer surface; a plurality of tubes fixed to said second plate portion; each of said tubes having an inlet at said outer surface of said second plate portion; each of said tubes having an outlet located adjacent said outer surface of said mold for directing fluid from said plenum inlet for jet flow against said mold and for return flow of said jet flow through said mold box and out said plenum outlet; a plurality of elongated spacer members interconnecting said first plate portion and said second plate portion and supporting said tubes in fixed relation with respect to said mold independently of said mold box and permitting return flow of said jet flow through said mold box to said plenum outlet; a first seal portion engageable with said mold box for sealing against fluid leakage between said module and said mold box at said first plate portion; a second seal portion engageable with said mold box for sealing against fluid leakage between said module and said mold box at said second plate portion and for sealing said mold box cavity from said plenum inlet;

said mold and the fluid flow through said tubes in each said module having a heat balance flow relationship that is significantly different from that in the other of said modules; and each of said modules being insertable in and removable from said cavity in said mold box for permitting interchangeability of said modules within said mold box without changing the heat balanced flow relationship between said molds and fluid flow through the tubes associated with said molds.

3. A plurality of interchangeable tube/mold modules for mounting in a readily removable manner within a fixed cavity of a mold box having a fluid flow inlet and a fluid flow outlet; said modules each comprising:

a first plate portion and a second plate portion having an inner surface and an outer surface; a mold supported on said first plate portion; said mold having an inner surface and an outer surface; a plurality of tubes connected to said second plate portion; each of said tubes having an inlet at said outer surface of said second plate portion; each of said tubes having an outlet located adjacent said outer surface of said mold for directing fluid from said fluid flow inlet for jet flow against said mold and for return flow of said jet flow through said mold box; support structure extending between and interconnecting said first and second plate portions in spaced apart relation and supporting said tubes in fixed relation with respect to said mold; said first plate portion adapted to be supported by a top wall of said mold box to thereby support said modules in said cavity;

said support structure comprising a plurality of spacer rods interconnecting said first plate portion to said second plate portion for permitting return flow of fluid from said mold to said fluid flow outlet; and said mold and the fluid flow through said tubes in each said module having a heat balanced flow relationship that is significantly different from that in the other of said modules.

4. The modules of claim 3 further comprising:

each of said modules having a first seal portion engageable with said mold box for sealing against fluid leakage between said module and said mold box at said first plate portion;

each of said modules having a second seal portion engageable with said mold box for sealing against fluid leakage between said module and said mold box at said second plate portion and for sealing said mold box cavity from said fluid flow inlet; and each of said modules being readily removable from said mold box for permitting interchangeability of said modules within said mold box without changing the heat balanced flow relationship between said molds and fluid flow through the tubes associated with said molds.

* * * * *